No. 659,354. Patented Oct. 9, 1900.
J. A. WHEELER.
DOOR.
(Application filed Jan. 18, 1900.)
(No Model.)
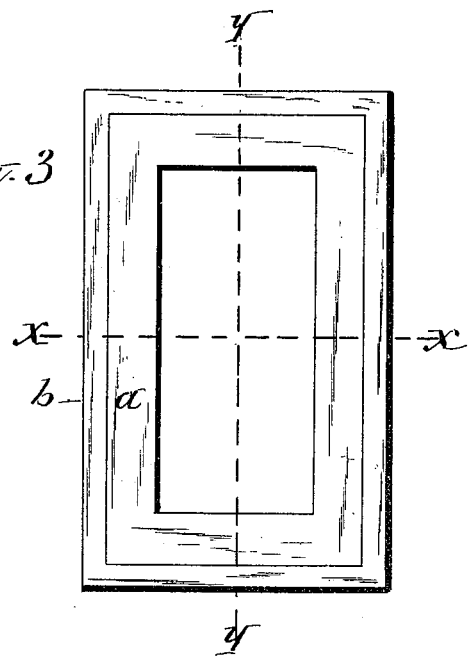
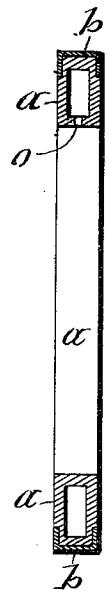
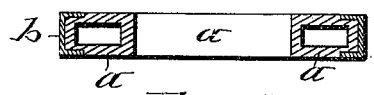
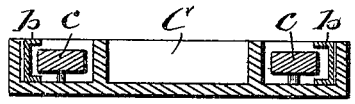
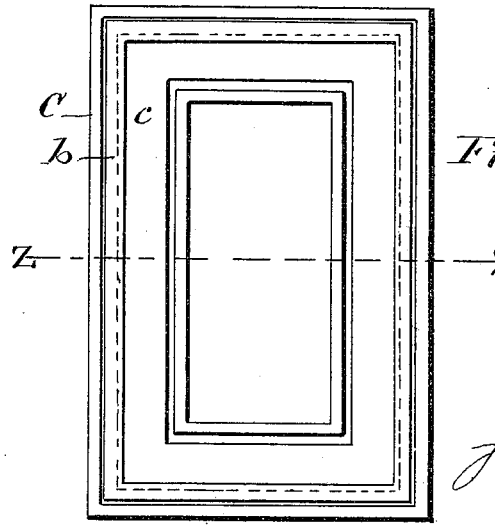
WITNESSES:
INVENTOR
James A. Wheeler
By E. Laass
ATTORNEY

UNITED STATES PATENT OFFICE.

JAMES AUGUSTUS WHEELER, OF OSWEGO, NEW YORK.

DOOR.

SPECIFICATION forming part of Letters Patent No. 659,354, dated October 9, 1900.

Application filed January 18, 1900. Serial No. 1,856. (No model.)

*To all whom it may concern:*

Be it known that I, JAMES AUGUSTUS WHEELER, a citizen of the United States, and a resident of Oswego, in the county of Oswego, in the State of New York, have invented new and useful Improvements in Doors and Analogous Articles, of which the following, taken in connection with the accompanying drawings, is a full, clear, and exact description.

This invention relates to the species of doors, shutters, and analogous frames or structures manufactured by the process described in my application for Letters Patent, Serial No. 727,639, filed August 18, 1899.

My present invention consists of a door or analogous structure or frame formed in one piece of solidified artificial compound cement, as hereinafter more fully described.

In the accompanying drawings, Figure 1 is a plan view of the mold employed for manufacturing the door or analogous article, together with the core for forming said article hollow or with an internal cavity, and also the metallic frame placed in said mold to embrace the article molded therein. Fig. 2 is a transverse section on line Z Z in Fig. 1. Fig. 3 is a plan view of the completed article; and Figs. 4 and 5 are transverse sections on lines X X and Y Y, respectively, in Fig. 3.

In manufacturing the aforesaid door or analogous article I resort to the process described in my aforesaid application for Letters Patent, Serial No. 727,639, which is substantially as follows, to wit: I form the article of a suitable plastic compound cement, which may be prepared in the manner described in my Letters Patent No. 539,928, dated May 28, 1895. In forming said article I employ a mold C of the requisite shape and size and place therein a core $c$, preferably formed of a suitable cohesive granular material, which becomes disintegrated when subjected to pressure and dried.

When it is desired to strengthen and protect the edges of the molded door or other article indicated at $a$ in the drawings, I place in the mold C a metallic frame $b$, corresponding to the outline of the article to be molded and preferably either L-shaped or T or U shaped in cross-section, so as to embrace the edges of the molded article. This metallic frame surrounds the core $c$ and is placed with the necessary distance between them to permit the molding of the outer edge of the article in the intervening space. After the said frame and core are placed in their positions I mold the plastic material between them and completely around the core to envelop the same. In this manner I form the frame or main portion $a$ of the door or analogous article. The article thus molded I then smooth on its exterior and place it in suitable dies, preferably perforated in the rear face and heated. These dies with the inclosed molded article I place in a suitable press to compress, dry, and harden the molded article. After this is effected I remove the dies from the press and the molded article from the dies. If the said article is of the form of a door or shutter or analogous article and is to imitate polished wood presenting a decorative grain, I run over the surface of said article a suitable elastic roller, preferably a gelatin-faced roller, carrying upon its surface a colored impression of the grain of the wood to be imitated. In case it is desired to reduce the weight of the molded article I provide the same with an aperture $o$. (Shown in Fig. 5 of the drawings.) Through this aperture I expel the core $c$, which during the aforesaid compressing and drying step of the process becomes disintegrated and pulverulent, so as to allow it to freely pass out through the aperture while the article is turned over and rapped to loosen the core particles.

What I claim as my invention is—

1. As an improved article of manufacture, a door or analogous article formed in one piece of solidified artificial compound cement and reinforced and protected by a metallic frame embracing said article around the edges thereof as set forth.

2. A door or analogous article composed of solidified compound cement and formed with an internal cavity and a metallic frame embracing said article around the edges thereof as set forth.

JAMES AUGUSTUS WHEELER. [L. S.]

Witnesses:
TIMOTHY D. MORRIS,
AUGUSTUS LEE, Jr.